United States Patent Office 3,828,042
Patented Aug. 6, 1974

---

3,828,042
PRODUCTION OF 3-SUBSTITUTED- AND 1,3-DI-SUBSTITUTED - 2,4(1H,3H) - QUINAZOLINE-DIONES, AND THE 2,4 THIO AND DITHIO ANALOGUES THEREOF
George F. Schlaudecker, Toledo, and Richard L. Jacobs, Perrysburg, Ohio, assignors to The Sherwin-Williams Company, Cleveland, Ohio
No Drawing. Continuation of application Ser. No. 656,691, July 28, 1967, which is a continuation-in-part of application Ser. No. 554,354, June 1, 1966, which in turn is a continuation-in-part of application Ser. No. 464,190, June 15, 1965, all now abandoned. This application Sept. 12, 1969, Ser. No. 860,159
Int. Cl. C07d 51/48
U.S. Cl. 260—251 QA          14 Claims

ABSTRACT OF THE DISCLOSURE

An improved method for the production of 3-substituted- and 1,3-disubstituted - 2,4(1H,3H) - quinazolinediones and the 2,4 thio and dithio analogous[1] thereof which involves the steps of mixing (in the absence of an HCl absorber) phosgene or thiophosgene with certain o-amino-N-substituted benzamides, o-amino-N-substituted thiobenzamides, o-substituted amino-N-substituted benzamides or o-substituted amino-N-substituted thiobenzamides, and heating the resulting reaction mixture to a temperature sufficiently high to cause evolution of HCl, but sufficiently low that decomposition does not occur.

---

This is a Streamline Continuation of Application Ser. No. 656,691 which was a Continuation-in-Part of application Ser. No. 554,354 which was a Continuation-in-Part of application Ser. No. 464,190, all by the same inventors, and filed respectively on July 28, 1967, June 1, 1966 and June 15, 1965, all now abandoned.

BACKGROUND OF THE INVENTION

Various methods for producing 3-substituted- and 1,3-disubstituted-2,4(1H,3H)-quinazolinediones, have heretofore been suggested.[2] For example, 3-methyl and 3-ethyl-2,4(1H,3H)-quinazolinediones have been produced from N-methyl and N-ethyl phthalamides by the Hoffmann reaction. Some such quinazolinediones have been produced from omega-substituted o-uramidobenzoic acids and esters thereof by thermal ring closure under acid conditions; however the corresponding quinazolinedione was not produced when the omega-substituent was sec-butyl, tert-butyl, allyl, or phenyl; 2,4(1H,3H)-quinazolinedione itself having been produced when the omega-substituent was tert-butyl. Phenyl- and p-bromophenylisocyanates have been reacted with isatoic anhydride to produce the corresponding 3-substituted - 2,4(1H,3H) - quinazolinediones. Ring closure of anatranilic acid has been suggested with phenylurea and substituted phenylurea to produce 3-phenyl- and 3-substituted phenyl 2,4(1H,3H)-quinazo-linediones, as well as ring closure with urea of some o-amino-N-(lower n-alkyl) benzamides to produce lower 3-n-alkyl 2,4(1H,3H)-quinazolinediones. Lower 3-n-alkyl 2,4(1H,3H)-quinazolinediones have also been produced by alkylation of 2,4(1H,3H)-quinazolinedione, e.g. with methyl iodide, dimethylsulfate or diazomethane. Other suggested methods [3] require exotic starting materials, or are prepared to produce only 3-aryl 2,4(1H,3H)-quinazo-linediones.

A new and improved method for producing 3-substituted- and 1,3-disubstituted 2,4(1H,3H)-quinazolinediones and the 2,4 thio and dithio analogues thereof is provided according to the invention. The method comprises mixing phosgene or thiophosgene, i.e., a compound having the general formula

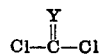

wherein Y is oxygen or sulfur, and one of certain o-amino-N-substituted benzamides and o-amino-N-substituted thiobenzamides or one of certain o-substituted amino-N-substituted benzamides and o-substituted amino-N-substituted thiobenzamides, and heating the resulting reaction mixture to a temperature sufficiently high to cause evolution of HCl, but sufficiently low that decomposition does not occur, and wherein the reaction is conducted in the absence of an HCl absorber.

The substituted benzamides and substituted thiobenzamides can have either of the general formulas:

o-substituted amino-N-substituted benzamides and o-amino-N-substituted thiobenzamides

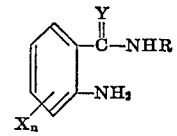

o-substituted amino-N-substituted benzamides and o-substituted amino-N-substituted thiobenzamides

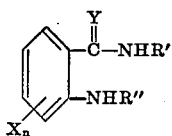

In the foregoing formulas, $n$ is an integer from 0 to 4; R is a member of the group consisting of alkyl groups having from 1 to 22 carbon atoms, cycloalkyl groups having from 3 to 22 carbon atoms, alkaryl groups having from 7 to 22 carbon atoms, aralkyl groups having from 7 to 22 carbon atoms, alkenyl groups having from 3 to 22 carbon atoms, alkynyl groups having from 3 to 22 carbon atoms, naphthyl, phenyl, halo-, nitro- and $CF_3$-substituted naphthyl, phenyl, alkyl naphthyl and alkyl phenyl groups, and 5 and 6 member heterocyclic groups; R' is a member of the group consisting of lower n-alkyl groups having from 1 to 6 carbon atoms, isopropyl, sec-butyl, phenyl and cycloalkyl groups having from 3 to 6 carbon atoms; R" is a lower n-alkyl group having from 1 to 6 carbon atoms; X is a member of the group consisting of halo, nitro, $CF_3$, and alkyl groups having from 1 to 22 carbon atoms; and Y is a member of the group consisting of oxygen or sulfur.

---

[1] The term "2,4 thio and dithio analogues," as used herein with reference to quinazolinediones, means the 2-thio, the 4-thio and the 2,4-dithio analogues.

[2] C.f.
Taub and Hino: J. Org. Chem., 26, 5238 (1961) and reference cited.
Staiger et al.: J. of Chem. and Eng. Data 8, 454 (1963), Abt: J. pr. 2 39, 147.
M. T. Bogert and C. E. May, J. Am. Chem. Soc. 31, 507 (1909).
M. T. Bogert and G. Scatchard, J. Am. Chem. Soc. 41, 2052 (1919).
F. E. Sheibley: J. Org. Chem. 12, 743 (1947) pp. 743–751.
(specifically, page 750, lines 9–16).
F. Arndt et al.: C.A. 43, 579 f (1949).
N. A. Lange and F. E. Sheibley: J. Am. Chem. Soc. 55, 2113 (1933).

[3] C.F.
Japanese patent 2,319 (1959).
N. S. Dokunikhin: C.A. 55, 21140 (1961).
U.S. Patent 2,769,003.
S. Horie: Nippon Hagaku Zauhi 80, 1038 (1959), C. A. 55, 5510 (1961).
U.S. Patent 2,680,741.
German Patent 1,068,263 (1959).
U.S. Patent 3,149,106.

The reaction involved in producing substituted-2,4-(1H,3H)-quinazolinediones according to the method of the invention occurs in two steps. Hydrogen chloride from the phosgene or thiophosgene can be evolved during both steps. The first step occurs spontaneously, and is exothermic in nature. The second step occurs only slowly unless the reaction mixture is heated above ambient temperature, and occurs readily at temperatures in the vicinity of 100°[4]. As a consequence, the reaction temperature can readily be controlled by the use of a suitable solvent for the reactants and reaction product and by supplying sufficient heat to cause vaporization of the solvent while using a reflux condenser to return the vaporized solvent to the reaction mixture. It has been found that, in order to maximize yield by the method of the invention, it is essential that the reaction be carried out in the absence of an HCl absorber.

The solvent must be one which vaporizes, under the pressure at which the reaction is conducted, at a temperature sufficiently high to enable evolution of HCl from the second step of the reaction, and, if solvent reflux is utilized for temperature control purposes, must also vaporize at a temperature sufficiently low that decomposition does not occur within the reaction mixture. In addition, the solvent must be one which is inert relative to phosgene and thiophosgene. Examples of suitable solvents that are admirably adapted for use when the reaction is conducted under ordinary ambient pressure include p-dioxane, p-xylene and 1,1,2,2-tetrachloroethane.

The overall reaction for the production of 3-substituted-2,4(1H,3H)-quinazolinediones, and the 1,3-disubstituted-2,4(1H,3H)-quinazolinediones, and the 2,4-thio and dithio analogues thereof is illustrated below. In the formulas shown, n, R, R', R'', X, and Y have the meanings described previously.

Overall Reaction for Production of Substituted 2,4(1H,3H)-Quinazolinediones

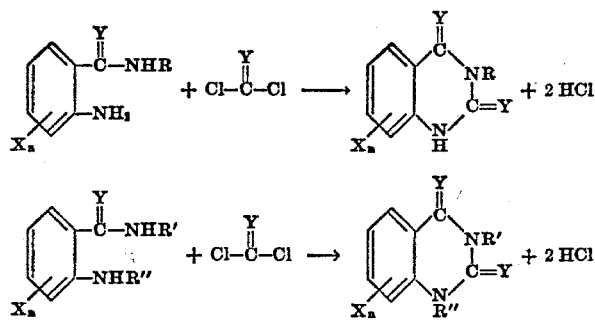

The o-amino-N-substituted benzamides represented by the foregoing formulas, i.e., where Y is oxygen, are all either known compounds or compounds which can be produced by known methods (see, for example, the several references identified herein). The o-substituted amino-N-substituted benzamides, i.e., where Y is oxygen in the foregoing formulas, can all be produced by (1) alkylating isatoic anhydride or a substituted isatoic anhydride, using sodium hydride and an organic halide, and (2) reacting the alkylated anhydride with an amine. These reactions are subsequently discussed in more detail.

The o-amino-N-substituted thiobenzamides and the o-substituted amino-N-substituted thiobenzamides represented by the foregoing formulas, i.e., when Y is sulfur, can all be produced according to a known method[5] from the corresponding benzamides. This method which involves the reaction of a substituted benzamide with $P_2S_5$ is subsequently discussed in more detail.

[4] All temperatures herein are given in degrees Centigrade.
[5] Meyer et al.: J. of Medicinal Chemistry, Vol. 8, No. 4, 515 (1965).

Some of the substituted - 2,4(1H,3H) - quinazolinediones which can be produced by the method of the invention are useful as intermediates in the production of chemicals having known pharmacological activity.[6] The method also enables the preparation of new quinazolinediones which have not previously been synthesized, and is, therefore, useful as providing a route to new intermediates enabling investigation of end products similar in chemical nature to products of known pharmacological activity. In addition the quinazolinediones which have been made by the method have unexpected herbicidal activity, and absorb ultraviolet radiation within the burning spectrum.

The following Examples are presented solely for the purpose of further illustrating and disclosing the production of various substituted-2,4(1H,3H)-quinazolinediones according to the invention, and are in no way to be construed as limiting.

EXAMPLE I 3-sec-butyl-2,4(1H,3H)-quinazolinedione was prepared in a 50 ml. three-neck flask equipped with a mechnical stirrer, a thermometer, a reflux condenser and a gas inlet tube which extended to within about one-half inch of the bottom of the flask. The flask was charged with 19.2 grams of o-amino-N-sec-butylbenzamide (N.W. 192.2) and 350 ml. p-dioxane. The mechanical stirrer was then started and the introduction of phosgene into the flask through the gas inlet tube was commenced at a rate of approximately one-half gram per minute. Phosgene (N.W. 98.9) introduction was continued until a total of 9.9 g. thereof had been introduced; this required a little less than twenty minutes. The temperature of the reaction mixture was noted immediately prior to commencement of introduction of phosgene, and periodically thereafter; such temperatures are presented in Table 1, below, wherein the instant before the commencement of phosgene addition is treated as zero time:

TABLE 1

| Time | Temperature, degrees |
|---|---|
| 0:00 | 21 |
| 0:02 | 21½ |
| 0:04 | 25 |
| 0:09 | 36 |
| 0:22 [1] | 39 |
| 0:36 | 68 |
| 0:47 | 90 |
| 1:17 | 98 |
| 1:29 | 99½ |
| 3:09 [2] | 102 |
| 4:44 | 29½ |

[1] At this point in the preparation the flask was fitted with a heating mantle and heat was transferred to the flask and contents from the mantle at a rate sufficient to cause heating as indicated.
[2] At this point heating of the flask was discontinued.

At the 4:44 time relative to the reaction, there were no solids in the reaction mixture. The reflux condenser was then removed from the three-neck flask, and vacuum was drawn on the flask by means of water aspiration; heat was again supplied to the flask through the heating mantle to distill the n-dioxane. The heating under vacuum was continued to a temperature of 60° and an absolute pressure of 25 mm. Hg. At this time the flask contained approximately 100 ml. of reaction product and solvent. The concentrated reaction products were cooled to room temperature of about 20° and were then dissolved in 250 ml. absolute methyl alcohol. The resulting methyl alcohol solution was treated with "Neutral" activated charcoal (C-190-N); the charcoal was separated from the solution by filtration; the solution was heated until boiling was observed and was then diluted with water until clouding was observed, which required approximately 400 ml.

[6] Cf., U.S. Pat. 2,680,741.

water. The resulting slurry of product, methanol and water was cooled on an ice bath to a temperature of approximately 5°, and the product was separated from the cooled slurry by filtration. The product was then dried to constant weight under infra-red lights. The total recovery amounted to 18.1 g. (83 percent of theory) 3-sec-butyl-2,4(1H,3H)-quinazolinedione (a light tan crystalline solid, melting point 131.0°–132.5° C.).

The infra-red absorption pattern of the product was compared with the infra-red absorption pattern of a known sample of 3-cyclohexyl-2,4(1H,3H)-quinazolinedione. The comparison indicated that the product was a 3-substituted-2,4(1H,3H)-quinazolinedione. The elemental analysis for carbon and hydrogen of the product, after recrystallization, and theory for 3-sec-butyl-2,4(1H,3H)-quinazolinedione are presented below:

| | Elemental analysis (percent) | |
|---|---|---|
| | Found | Theory |
| C | 66.04 | 66.00 |
| H | 6.47 | 6.67 |

Substantially the procedure described above was repeated, except that the reaction mixture, after cooling to about room temperature, was poured into 1 l. of water to form a water-p-dioxane-product slurry; the slurry was cooled to about 5° C.; an addition of 500 ml. water was II, is that of the dried product, without recrystallization. Similarly, melting points as reported in the Table are of the dried product, without recrystallization. Where elemental analyses are presented, these analyses are of recrystallized material.

TABLE II

| Procedure Number | Amide or anilide starting material | | Ring closing starting material | | Amount of p-dioxane, ml. | Product | | | | |
|---|---|---|---|---|---|---|---|---|---|---|
| | Name | Grams | Name | Grams | | Name | Grams | Percent yield | Melting point, degrees | Color |
| 2 | o-Amino-N-isopropylbenzamide | 25 | Phosgene | 13.9 | 500 | 3-isopropyl-2,4(1H,3H)-quinazolinedione | 24.2 | 84.6 | 188–189 | Light tan. |
| 3 | do | 2.2 | do | 1.3 | 50 | do | 2.2 | 86.3 | 187–189 | Do. |
| 4 | o-Aminobenzanilide | 5.3 | do | 2.5 | 50 | 3-Phenyl-2,4-(1H,3H)-quinazolinedione | 5.1 | 85 | 283–284 | Off-white. |
| 5 | 2-Amino-5-chlorobenzanilide | 26.3 | do | 9.9 | 250 | 3-Phenyl-6-chloro-2,4-(1H,3H)-quinazolinedione | 20.2 | 80 | 304.5–306 | Light yellow. |
| 6 | 2-Amino-3',4',5-trichlorobenzanilide | 31.6 | do | 9.9 | 350 | 3-(3',4'-dichlorophenyl)-6-chloro-2,4-(1H,3H)-quinazolinedione | 21.4 | 62.7 | 362–365 | Tan. |
| 7 | 2-Amino-N-cyclohexylbenzamide | 21.8 | do | 9.9 | 350 | 3-Cyclohexyl-2,4(1H,3H)-quinazolinedione¹ | 17.6 | 72.2 | 270–272 | Cream colored. |
| 8 | 2-amino-5-nitrobenzamide | 25.7 | do | 9.9 | 350 | 3-phenyl-5-nitro-2,4-(1H,3H)-quinazolinedione | 24.2 | 85.5 | 292–295 | Yellow. |
| 9 | o-Amino-N-tert-butylbenzamide | 9.6 | do | 4.95 | 175 | 3-tert-butyl-2,4(1H,3H)-quinazoline dione | 8.2 | 75.2 | 192–192.5 | Off white. |
| 10 | 2-amino-3,4',5-tribromobenzanilide | 44.9 | do | 9.9 | 350 | 3-(4'-bromophenyl)-6,8-dibromo-2,4-(1H,3H)-quinazolinedione | 37.1 | 78.2 | 346.5–348 | Do. |
| 11 | o-Aminobenzanilide | 21.2 | Thiophosgene | 11.5 | 350 | 2-thio-3-phenyl-2,4(1H,3H)-quinazolinedione | 19.6 | 77.2 | 306–308 | Light tan. |
| 12 | o-Amino-N-isopropylbenzamide | 17.8 | do | 11.5 | 350 | 2-thio-3-isopropyl-2,4(1H,3H)-quinazolinedione | 16.2 | 73.7 | 173–175 | Light yellow. |
| 13 | o-Amino-N-propargylbenzamide | 17.4 | Phosgene | 9.9 | 350 | 3-propargyl-2,4(1H,3H)-quinazolinedione | 17.4 | 87 | 236.5–237.5 | White. |
| 14 | o-Amino-N-(branched tetradecyl)benzamide | 16.6 | do | 4.95 | 175 | 3-(branched tetradecyl)-2,4(1H,3H)-quinazolinedione | 11.8 | 65.9 | 72.5–80.5 | Light yellow. |
| 15 | o-Amino-N-sec-butylbenzamide | 19.2 | do | 9.9 | 350 | 3-sec-butyl-2,4(1H,3H)-quinazolinedione | 18.1 | 83 | 131–132.5 | White. |
| 16 | o-Amino-N-allylbenzamide | 17.6 | do | 9.9 | 350 | 3-ally1-2,4(1H,3H)-quinazolinedione | 15.3 | 75.8 | 184–185 | Do. |
| 17 | 2-amino-2'-carboxybenzanilide | 25.6 | do | 19.8 | 350 | 3-(o-carboxyphenyl)-2,4-(1H,3H)-quinazolinedione | 16 | 56.6 | 296.5–298 | Off white. |
| 18 | o-Amino-N-tetrahydrofurfurylbenzamide | 22 | do | 9.9 | 350 | 3-tetrahydrofurfuryl-2,4-(1H,3H)-quinazolinedione | 15.7 | 63.7 | 202–202 | White. |
| 19 | o-Amino-N-(2-heptyl)benzamide | 23.4 | do | 9.9 | 350 | 3-(2-heptyl)-2,4(1H,3H)-quinazolinedione | 23.3 | 89.6 | 101.5–102.5 | Do. |
| 20 | o-Amino-N-(2-ethylhexyl)-benzamide | 12.4 | do | 5 | 175 | 3-(2-ethylhexyl)-2,4(1H,3H)-quinazolinedione | 10.1 | 73.8 | 145–146 | Do. |
| 21 | o-Amino-N-(2-methylcyclohexyl)-benzamide | 23.2 | do | 9.9 | 350 | 3-(2-methylcyclohexyl)-2,4(1H,3H)-quinazolinedione | 25.5 | 99.6 | 209–212 | Do. |
| 22 | o-Amino-N-carbethoxyaminobenzamide | 22.3 | do | 9.9 | 350 | 3-(carbethoxyamino)-2,4(1H,3H)-quinazolinedione | 20.5 | 82.3 | 225.5–227 | Do. |
| 23 | o-Amino-N-methylbenzamide | 60.1 | do | 39.6 | 1,400 | 3-methyl-2,4(1H,3H)-quinazolinedione | 72.5 | 88.1 | 238–239.5 | Do. |
| 24 | o-Amino-N-(3-heptyl)benzamide | 23.4 | do | 9.9 | 350 | 3-(3-heptyl)2,4(1H,3H)-quinazolinedione | 17.2 | 66.1 | 80–83.5 | Off white. |
| 25 | o-Amino-N-(2-octyl)benzamide | 49.7 | do | 19.8 | 700 | 3-(2-octyl)-2,4(1H,3H)-quinazolinedione | 45 | 82 | 82–85.5 | White. |
| 26 | o-Amino-N-(branched hexadecyl)benzamide | 18 | do | 1.6 | 175 | 3-(branched-hexadecyl)-2,4(1H,3H)-quinazolinedione | 1.6 | 8.3 | 85.5–102.5 | Do. |
| 27 | o-amino-2'-ethylbenzanilide | 12 | do | 9.9 | 175 | 3-(2-ethylphenyl)-2,4(1H,3H)-quinazolinedione | 11.6 | 87.2 | 272.5–277.5 | Do. |
| 28 | o-Amino-N-isopropylthiobenzamide | 19.4 | do | 9.9 | 350 | 4-thio-3-isopropyl-2,4(1H,3H)-quinazolinedione | 20.4 | 92.7 | 203.5–204.5 | Yellow. |

¹ The infra-red absorption pattern was found to be identical with that of a known sample of the same material produced by the known method of R. P. Staiger and E. C. Wagner: J. Org. Chem., 18, 1427 (1953).

then made to the cooled slurry; and the product was separated by filtration. After drying, the yield was found to be substantially the same, and the product quality only slightly lower.

Numerous other substituted-2,4(1H,3H)-quinazolinediones have been produced by procedures generally the same as that described in Example 1, above, and the desired product has been worked up in one of the manners previously described, or, in instances where the product was relatively insoluble in p-dioxane, a first fraction was recovered by filtration, and subsequent fractions were recovered by one of the described techniques. Typical results of such procedures are summarized in Table II, below. Time-temperature readings for each of the procedures summarized in Table II are presented following the Table, together with analytical data, in some instances. In all cases, the color of the final product, as reported in Table Procedure No. 2

| Time | Temperature, degrees |
|---|---|
| 0:00 | 22 |
| 0:14 | 18½ |
| 0:16 | 21 |
| 0:18 | 24 |
| 0:24 | 39 |
| 0:38 | 37 |
| 0:42 | 38 |
| 1:02 | 88 |
| 1:21 | 93 |
| 1:25 | 94 |
| 1:32 | 96 |
| 2:06 | 101 |
| 2:50 | 102 |
| 3:25 | 102 |
| 6:20 | 26 |

Procedure No. 3

| Time | Temperature, degrees |
|---|---|
| 0:00 | 23 |
| 0:02.5 | 23½ |
| 0:02.8 | 27 |
| 0:03.5 | 35 |
| 0:05 | 41 |
| 0:18 | 85 |
| 0:25 | 96½ |
| 0:29 | 99 |
| 0:40 | 102 |
| 1:20 | 46 |
| 2:45 | 27 |

Procedure No. 4

| Time | Temperature, degrees |
|---|---|
| 0:00 | 29½ |
| 0:44 | 30 |
| 0:45 | 34 |
| 0:46 | 39½ |
| 0:47 | 44½ |
| 0:48 | 47 |
| 0:49 | 48 |
| 0:51 | 43 |
| 1:49 | 83 |

Procedure No. 5

| Time | Temperature, degrees |
|---|---|
| 0:00 | 22 |
| 0:59 | 22 |
| 1:01.5 | 25½ |
| 1:08 | 38 |
| 1:12.5 | 40 |
| 1:16.4 | 36 |
| 1:35 | 56 |
| 1:47 | 74 |
| 1:57 | 86 |
| 2:05 | 93 |
| 2:15 | 96 |
| 2:30 | 98 |
| 3:45 | 100 |
| 4:05 | 100 |
| 4:45 | 17½ |
| 5:30 | 17 |

| Elemental analysis (percent) | | |
|---|---|---|
| | Found | Theory |
| C | 61.22 | 61.66 |
| H | 3.34 | 3.33 | corrected melting point after recrystallization: 308°–309°

Procedure No. 6

| Time | Temperature, degrees |
|---|---|
| 0:00 | 20½ |
| 1:05 | 21 |
| 1:09 | 28 |
| 1:18 | 36 |
| 1:20 | 36½ |
| 1:22 | 37½ |
| 1:25 | 37½ |
| 1:53 | 76½ |
| 2:01 | 84 |
| 3:09 | 100½ |
| 3:20 | 101 |
| 4:05 | 102½ |
| 4:35 | 102 |
| 7:15 | 102 |

| Elemental analysis (percent) | | |
|---|---|---|
| | Found | Theory |
| C | 49.35 | 49.22 |
| H | 2.73 | 2.07 |

Corrected melting point after recrystallization: 366–367°

Procedure No. 7

| Time | Temperature, degrees |
|---|---|
| 0:00 | 18 |
| 0:05 | 19 |
| 0:06 | 21 |
| 0:07 | 23 |
| 0:09 | 25 |
| 0:12 | 33 |
| 0:18 | 37 |
| 0:25 | 36½ |
| 0:49 | 82 |
| 0:55 | 89 |
| 1:25 | 94 |
| 1:27 | 94 |
| 1:55 | 99 |
| 2:05 | 100 |
| 3:15 | 102 |
| 3:37 | 60 |
| 4.35 | 10 |

| Elemental analysis (percent) | | |
|---|---|---|
| | Found | Theory |
| C | 69.09 | 68.83 |
| H | 6.60 | 6.60 |
| N | 11.53 | 11.47 |

Corrected melting point after recrystallization: 271.5°–272.5°

Procedure No. 8

| Time | Temperature, degrees |
|---|---|
| 0:00 | 21 |
| 0:06 | 21 |
| 0:10 | 21 |
| 0:14 | 25 |
| 0:15 | 25½ |
| 0:30 | 37 |
| 0:45 | 71 |
| 0:52 | 85 |
| 1:00 | 92 |
| 1:37 | 99 |
| 1:45 | 100 |
| 2:17 | 101½ |
| 2:30 | 102 |
| 2:43 | 78 |
| 6:00 | 15 |

| Elemental analysis (percent) | | |
|---|---|---|
| | Found | Theory |
| C | 59.47 | 59.37 |
| H | 3.22 | 3.20 |
| N | 14.82 | 14.84 |

Corrected melting point after recrystallization 295.5°–296.5°

Procedure No. 9

| Time | Temperature, degrees |
|---|---|
| 0:00 | 19 |
| 0:01 | 19 |
| 0:01.5 | 22½ |
| 0:02 | 24 |
| 0:11 | 38½ |
| 0:31 | 87 |
| 1:07 | 93 |
| 1:09 | 93 |
| 2:04 | 99 |
| 3:09 | 100 |
| 22:06 | 21½ |

Elemental analysis.—N: Found, 12.41; theory, 12.84.

Corrected melting point after recrystallization: 194.5°–195.5°

Procedure No. 10

| Time | Temperature, degrees |
|---|---|
| 0:00 | 18 |
| 0:07 | 18 |
| 0:13 | 23 |
| 0:15 | 26 |
| 0:15.5 | 27 |
| 0:24 | 36½ |
| 0:27 | 38 |
| 0:41 | 80 |
| 0:51 | 92 |
| 1:03 | 95 |
| 1:23 | 99½ |
| 5:03 | 100 |
| 21:43 | 101½ |
| 50:23 | 102 |

| | Elemental analysis (percent) | |
|---|---|---|
| | Found | Theory |
| Br | 50.68 | 50.48 |
| N | 5.78 | 5.90 |

Corrected melting point after recrystallization: 346.5°–348°

Procedure No. 11

| Time | Temperature, degrees |
|---|---|
| 0:00 | 24 |
| 0:04 | 27½ |
| 0:15 | 35 |
| 0:21 | 35 |
| 0:31 | 57 |
| 1:20 | 93½ |
| 1:35 | 95 |
| 3:40 | 100 |
| 5:10 | 101 |

Procedure No. 12

| Time | Temperature, degrees |
|---|---|
| 0:00 | 24 |
| 0:04 | 26 |
| 0:05 | 26 |
| 0:15 | 31 |
| 0:22 | 30 |
| 0:31 | 50 |
| 1:01 | 95 |
| 1:35 | 98 |
| 5:10 | 101 |

Procedure No. 13

| Time | Temperature, degrees |
|---|---|
| 0:00 | 24 |
| 0:01 | 25 |
| 0:02 | 28 |
| 0:10 | 40 |
| 0:19 | 40½ |
| 0:37 | 70 |
| 0:45 | 78 |
| 0:57 | 84 |
| 1:44 | 81 |
| 4:33 | 82 |

| | Elemental analysis (percent) | |
|---|---|---|
| | Found | Theory |
| C | 65.6 | 65.9 |
| H | 4.3 | 4.0 |

Corrected melting point after recrystallization: 239°–240.5°

Procedure No. 14

| Time | Temperature, degrees |
|---|---|
| 0:00 | 21 |
| 0:01 | 23 |
| 0:07 | 36½ |
| 0:10 | 38½ |
| 0:30 | 55 |
| 0:43 | 67 |
| 1:03 | 84 |
| 2:38 | 98 |
| 6:00 | 100 |

| | Elemental analyss (percent) | |
|---|---|---|
| | Found | Theory |
| C | 73.81 | 73.70 |
| H | 9.57 | 9.56 |

Corrected melting point after recrystallization: 72.5°–80.5°

Procedure No. 15

| Time | Temperature, degrees |
|---|---|
| 0:00 | 21½ |
| 0:02 | 25 |
| 0:07 | 36 |
| 0:20 | 39 |
| 0:34 | 68 |
| 0:45 | 90 |
| 1:15 | 98 |
| 1:27 | 99½ |
| 3:07 | 102 |
| 4:42 | 29½ |

| | Elemental analysis (percent) | |
|---|---|---|
| | Found | Theory |
| C | 66.0 | 66.0 |
| H | 6.6 | 6.4 |

Corrected melting point after recrystallization: 131°–132.5°

Procedure No. 16

| Time | Temperature, degrees |
|---|---|
| 0:00 | 20 |
| 0:02 | 24½ |
| 0:17 | 35 |
| 0:20 | 34½ |
| 0:43 | 78 |
| 0:56 | 91 |
| 1:33 | 97 |
| 2:20 | 100 |
| 4:45 | 100½ |
| 5:10 | 26 |

| | Elemental analysis (percent) | |
|---|---|---|
| | Found | Theory |
| C | 65.0 | 65.3 |
| H | 5.0 | 4.98 |

Corrected melting point after recrystallization: 183.5°–184.5°

Procedure No. 17 [1]

| Time | Temperature, degrees |
|---|---|
| 0:00 | 22½ |
| 0:02 | 26 |
| 0:04 | 29 |
| 0:11 | 36 |
| 0:22 | 36 |
| 0:29 | 37 |
| 0:33 | 36½ |
| 0:40 | 35 |
| 0:49 | 44 |
| 1:24 | 94 |
| 2:02 | 100 |
| 4:02 | 101 |

[1] Two equiv. COCl₂ used.

| | Elemental analysis (percent) | |
|---|---|---|
| | Found | Theory |
| C | 63.73 | 63.82 |
| H | 3.54 | 3.57 |

Corrected melting point after recrystallization: 296.5 (dec.)–298°

Procedure No. 18

| Time | Temperature, degrees |
|---|---|
| 0:00 | 23 |
| 0:03 | 27 |
| 0:06 | 35 |
| 0:13 | 38 |
| 0:20 | 42 |
| 0:40 | 86 |
| 1:00 | 96 |
| 2:45 | 101 |
| 4:28 | 102 |

| | Elemental analysis (percent) | |
|---|---|---|
| | Found | Theory |
| C | 63.9 | 63.4 |
| H | 5.9 | 5.7 |

Corrected melting point after recrystallization: 202°–205°

Procedure No. 19

| Time | Temperature, degrees |
|---|---|
| 0:00 | 24 |
| 0:02 | 29 |
| 0:05 | 35 |
| 0:08 | 37 |
| 0:11 | 39 |
| 0:25 | 40 |
| 0:43 | 82 |
| 0:58 | 93 |
| 2:28 | 100½ |
| 3:36 | 101 |

| | Elemental analysis (percent) | |
|---|---|---|
| | Found | Theory |
| C | 68.83 | 69.2 |
| H | 7.73 | 7.74 |

Corrected melting point after recrystallization: 101.5°–102.5°

Procedure No. 20

| Time | Temperature, degrees |
|---|---|
| 0:00 | 22 |
| 0:02 | 26 |
| 0:10 | 38 |
| 0:33 | 86 |
| 0:43 | 95 |
| 1:00 | 100 |
| 2:08 | 101 |
| 2:08 | 101 |
| 3:18 | 35 |

| | Elemental analysis (percent) | |
|---|---|---|
| | Found | Theory |
| C | 69.8 | 70.0 |
| H | 7.97 | 8.08 |

Corrected melting point after recrystallization: 145°–146°

Procedure No. 21

| Time | Temperature, degrees |
|---|---|
| 0:00 | 22 |
| 0:05 | 31 |
| 0:09 | 36½ |
| 0:20 | 35 |
| 1:08 | 94 |
| 2:25 | 102 |
| 4:10 | 102 |
| 5:12 | 20 |

| | Elemental analysis (percent) | |
|---|---|---|
| | Found | Theory |
| C | 69.9 | 69.7 |
| H | 7.1 | 7.0 |

Corrected melting point after recrystallization: 209°–212°

Procedure No. 22

| Time | Temperature, degrees |
|---|---|
| 0:00 | 22½ |
| 0:04 | 29½ |
| 0:09 | 35 |
| 0:20 | 39 |
| 0:59 | 93 |
| 1:08 | 95 |
| 5:16 | 101 |

| | Elemental analysis (percent) | |
|---|---|---|
| | Found | Theory |
| C | 52.8 | 53.0 |
| H | 4.3 | 4.4 |

Corrected melting point after recrystallization: 225.5°–227°

Procedure No. 23

| Time | Temperature, degrees |
|---|---|
| 0:00 | 23 |
| 0:14 | 32½ |
| 0:20 | 33½ |
| 2:12 | 92 |
| 2:34 | 95 |
| 4:02 | 99½ |
| 5:46 | 101 |

Procedure No. 24

| Time | Temperature, degrees |
|---|---|
| 0:00 | 25 |
| 0:10 | 38½ |
| 0:20 | 39 |
| 0:59 | 87 |
| 2:13 | 98½ |
| 4:58 | 100½ |

| | Elemental analysis (percent) | |
|---|---|---|
| | Found | Theory |
| C | 69.6 | 69.2 |
| H | 7.7 | 7.7 |

Corrected melting point, after recrystallization: 80°–83.5°

Procedure No. 25

| Time | Temperature, degrees |
|---|---|
| 0:00 | 22½ |
| 0:09 | 31 |
| 0:18 | 35 |
| 0:40 | 34 |
| 1:06 | 71 |
| 1:26 | 90 |
| 3:18 | 96 |
| 5:39 | 96 |

| | Elemental analysis (percent) | |
|---|---|---|
| | Found | Theory |
| C | 70.7 | 70.0 |
| H | 8.3 | 8.1 |

Corrected melting point after recrystallization: 82°–85.5°

Procedure No. 26

| Time | Temperature, degrees |
|---|---|
| 0:00 | 19½ |
| 0:10 | 37 |
| 1:12 | 95 |
| 2:12 | 99 |
| 5:42 | 97½ |

| | Elemental analysis (percent) | |
|---|---|---|
| | Found | Theory |
| C | 74.1 | 74.5 |
| H | 9.8 | 9.9 |

Corrected melting point after recrystallization: 85.5°–88.5°

Procedure No. 27

| Time | Temperature, degrees |
|---|---|
| 0:00 | 24 |
| 0:05 | 38½ |
| 0:10 | 41 |
| 1:08 | 83½ |
| 2:17 | 96 |
| 2:50 | 97 |
| 4:40 | 99 |

| | Elemental analysis (percent) | |
|---|---|---|
| | Found | Theory |
| C | 72.5 | 72.2 |
| H | 5.3 | 5.3 |

Corrected melting point after recrystallization: 272.5°–277.5°

Procedure No. 28

| Time | Temperature, degrees |
|---|---|
| 0:00 | 25 |
| 0:01 | 27 |
| 0:09 | 31 |
| 0:10 | 37 |
| 0.15 | 39 |
| 0:20 | 41 |
| 0:40 | 80 |
| 0:45 | 88 |
| 1:02 | 95 |
| 1:22 | 97 |
| 1:30 | 101 |
| 3:15 | 101 |
| 4:28 | 101 |

| | Elemental analysis (percent) | |
|---|---|---|
| | Found | Theory |
| C | 59.89 | 59.97 |
| H | 5.46 | 5.49 |
| N | 12.73 | 12.72 |
| S | 14.67 | 14.56 |

Corrected melting point after recrystallization: 203.5°–204.5°

When a known procedure [7] was modified by substituting o-amino-N-isopropylbenzamide, 2-amino-5-chlorobenzanilide or o-aminobenzanilide for o-amino-3,5-dichlorobenzamide, and reacting with a substantially equimolecular proportion of ethyl chloroformate in p-dioxane as a solvent, no 3-substituted-2,4(1H,3H)-quinazolinedione was formed. In another instance, o-amino-N-isopropylbenzamide was reacted by the known method with a large excess of ethyl chloroformate and, again, no 3-substituted-2,4,(1H,3H)-quinazolinedione was recovered, but could be produced by volatilizing the remaining ethyl chloroformate, adding caustic, water and ethyl alcohol to the residue, refluxing, evaporating to dryness, dissolving the crude product in water,[8] and acidifying. It will be apparent from the results of these experimental procedures and from the foregoing Examples according to the instant invention that ethyl chloroformate and phosgenes are not equivalent relative to the production of substituted-2,4(1H,3H)-quinazolinediones, and that the method of the instant invention constitutes a significant improvement because of its general applicability and simplicity.

As has been indicated above, the o-substituted amino-N-substituted benzamides from which 1,3-disubstituted-2,4(1H,3H)-quinazolinediones can be produced in accordance with the invention, can be produced by (1) alkylating isatoic anhydride or a substituted isatoic anhydride, using sodium hydride and an organic halide, and (2) reacting the alkylated anhydride with an amine. These reactions are illustrated by the following equations:

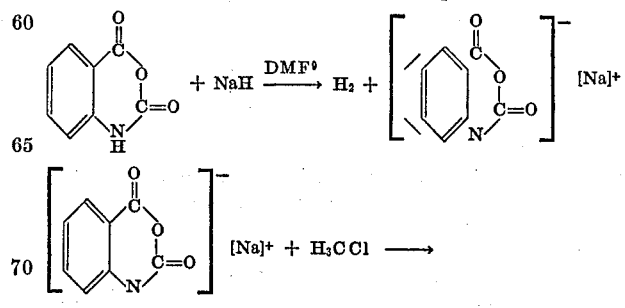

---

[7] F. E. Sheibley: J. Org. Chem. 12. 743 (1947) pp. 743–751 (specifically, page 750, lines 9–16).
[8] Solubility of the order of about 1 gram per liter.
[9] In dimethylformamide.

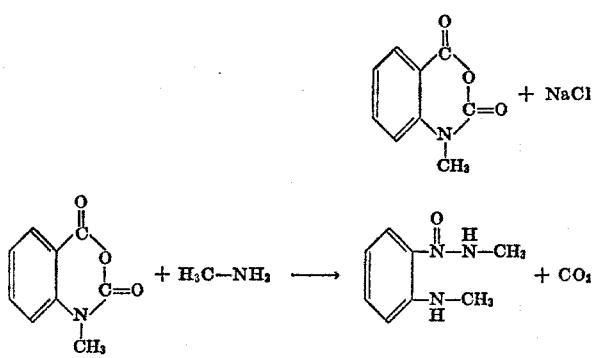

The above-illustrated reaction by which N-methylisatoic anhydride is produced from isatoic anhydride occurs only in the presence of a suitable solvent, such as dimethylformamide, no reaction proceeding, for example, in toluene. In the presence of dimethylformamide as a solvent, however, reaction is vigorous, and highly exothermic so that some care is desirable, particularly because of the evolution of hydrogen gas, to avoid overheating. The reaction can readily be carried out by dispersing the sodium hydride in the dimethylformamide, cooling the resulting dispersion, for example to a temperature of about 5° to 10°, and making a dropwise addition, for example over a period of about 3 to 4 hours, of an isatoic anhydride solution in dimethylformamide. The reaction mixture is desirably shielded from contact with moisture, for example by applying a dry nitrogen atmosphere to the surface thereof; the nitrogen atmosphere is also advantageous in helping to carry away hydrogen which is evolved as a consequence of reaction between the sodium hydride and the isatoic anhydride. After this reaction is substantially complete, methyl chloride can be bubbled through the reaction mixture, with stirring, to form the N-methylisatoic anhydride.

The alkylation reaction described in the preceding paragraph hereof can also be carried out with substituted isatoic anhydrides, for example those having the following general formulas

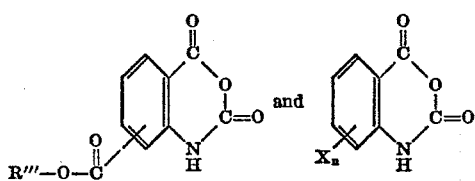

wherein $n$ and X have the meanings previously set forth, and R''' is selected from the group consisting of alkyl groups having from 1 to 22 carbon atoms, cycloalkyl groups having from 3 to 22 carbon atoms, alkaryl groups having from 7 to 22 carbon atoms, aralkyl groups having from 7 to 22 carbon atoms, phenyl and naphthyl. Similarly, the reaction proceeds when other $n$-alkyl chlorides are substituted for methyl chloride, for example lower $n$-alkyl chlorides having from 2 to 6 carbon atoms. Benzyl chloride can also be reacted with isatoic anhydride in a similar manner, as can allyl chloride. The use of chlorinated alkylating agents is usually preferred for economic reasons, although satisfactory alkylations have been carried out with the corresponding bromides; and iodides have been used where alkylation with a branched chain group was desired. It has not been found to be necessary to use the more active potassium hydride in alkylating isatoic anhydride as discussed above and, likewise, it has not been found necessary to use a less reactive hydride, such as that of calcium or magnesium.

The reaction of N-substituted isatoic anhydrides with amines is known [10] and can be carried out in the manner which has previously been suggested. The o-methylamino-N-isopropylbenzamide, and equivalents therefor, can be reacted with phosgene in the manner described above in Example 1. The course of a typical reaction involving o-methylamino - N - isopropylbenzamide and phosgene is set forth in Table III, below which is followed by time temperature data concerning the reaction, and analytical data:

TABLE III

| Procedure number | Amide or anilide starting material | | Amount of p-dioxane, ml. | Ring closing starting material | | Product | | | | |
|---|---|---|---|---|---|---|---|---|---|---|
| | Name | Grams | | Name | Grams | Name | Grams | Percent yield | Melting point degrees | Color |
| 29 | o-Methylamino-N-isopropyl benzamide. | 19.2 | 350 | Phosgene | 9.9 | 1-Methyl-3-isopropyl-2,4-(1H,3H)-quinazolinedione. | 14.7 | 67.4 | 131–132 | White. |

Procedure No. 29

| Time | Temperature, degrees |
|---|---|
| 0:00 | 18½ |
| 0:05 | 31½ |
| 0:20 | 38 |
| 2:08 | 100 |
| 73:33 | 102½ |

| | Elemental analysis (percent) | |
|---|---|---|
| | Found | Theory |
| C | 65.9 | 66.0 |
| H | 6.44 | 6.46 |

Corrected melting point after recrystallization: 131.5°–132.5°

Typical organic halides that have been used for the N-alkylation of 30 g. isatoic anhydride dissolved in 150 ml. dimethylformamide, together with the identities of the final products and yield data, are presented in the following Table IV:

TABLE IV

| Organic halide | | Product | |
|---|---|---|---|
| Identity | Grams | Identity | Yield, percent |
| Benzyl chloride | 25 | N-benzylisatoic anhydride. | 97 |
| Methyl chloride | 9.99 | N-methylisatoic anhydride. | 95 |
| Ethyl bromide | 21.58 | N-ethylisatoic anhydride. | 92 |
| Allyl chloride | 15.15 | N-allylisatoic anhydride. | 87 |
| Isopropyl iodide | 33.66 | N-isopropylisatoic anhydride. | 32 |

In all cases the isatoic anhydride was added slowly over a period of 3 to 4 hours to a dispersion of 10 g. sodium hydride, added as a 50 percent mineral oil dispersion, in 150 ml. dimethylformamide, and the reactants and reaction products were maintained at about 5° to 10°. The addition of the organic halide was made at different times, before, during or after charging of the isatoic anhydride, with no apparent effect on the course of the

---

[10] J. Org. Chem., 24, 1214 (1950).

reaction. The product can easily be recovered by quenching the reaction mixture in water acidified, e.g., with HCl, to a pH of 1 to 3; the N-substituted isatoic anhydride is insoluble and stable, and can be recovered by filtration.

As has been indicated above, the substituted thiobenzamides from which the substituted 2,4 thio and dithio substituted - 2,4(1H,3H) - quinazolinediones can be produced in accordance with the invention, are produced by a known method which involves reacting an o-amino-N-substituted benzamide or an o-substituted amino-N-substituted benzamide with $P_2S_5$. In this reaction, the oxygen of the carbonyl group is replaced by sulfur. In the overall reactions illustrated below, $n$, R, R', R'' and X have the meanings designated above.

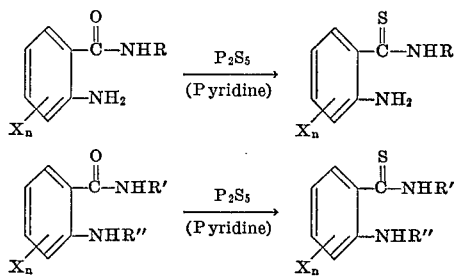

This method is more fully described in the example which follows.

EXAMPLE 30.—Preparation of o-Amino-N-Isopropylthiobenzamide

A 500 ml., three necked flask equipped with a mechanical stirrer, a thermometer, a reflux condenser, and a heating mantle was charged with 100 ml. of pyridine, 44.56 gm. of o-amino-N-isopropylbenzamide, and 55.57 gm. of phosphorus pentasulfide. Mixture of these ingredients produced an exothermic reaction which caused the temperature of the reaction mixture to rise from 24° to 66° over a period of about 10 minutes. The flask was then heated to a temperature of 131° causing the reactants to go into solution. Hydrogen sulfide began to evolve and heating was continued for about two hours until no more gas was evident. The reaction mixture was allowed to cool to room temperature and was then quenched by pouring it into 1 liter of ice water. The brown orange solids which appeared were collected by filtration and washed with an additional liter of water. The solids were then filtered from the above aqueous mixtures and transferred to a 1 liter 3 neck flask equipped with a mechanical stirrer, a thermometer, a reflux condenser and a heating mantle. After the addition of 500 ml. of benzene and 250 ml. of water, the mixture was heated under reflux for about 5 hours at which time two clear phases were visible. The flask contents were then transferred to a separatory funnel where the heavier water phase was removed. The remaining organic layer was washed with three, 350 ml. portions of water and then treated with activated charcoal. The charcoal was removed by filtration. A stream of compressed air was then passed through this organic layer causing evaporation of the benzene. A crude product was obtained which amounted to 31.7 gm. and had a melting point of 77°–81°. After recrystallization from isopropyl alcohol there remained 20.2 gm. of light yellow crystals having a melting point of 92°–93°. The product was identified by Infrared Spectroscopy, and its equivalent weight was determined by nitrate titration.

In a similar manner, other substituted thiobenzamides may be readily prepared according to this method by substituting o-amino-N-substituted benzamides and o-substituted amino-N-substituted benzamides for the o-amino-N-isopropylbenzamide of the above example.

As stated previously HCl is evolved during the reaction of the benzamides or thio-benzamides with phosgene. It has been found that, in order to maximize the yield by the method of the invention, it is essential that the reaction be carried out in the absence of an HCl absorber. The reason therefore is not precisely known; however, it appears that the presence of an HCl absorber hinders the reaction in some way. This is demonstrated by the procedure described below, when reaction was in the presence of triethylamine, an HCl absorber. The procedure is not in accordance with the invention, and is presented for purposes of comparison.

3-Isopropyl - 2,4(1H,3H) - quinazolinedione was prepared in a 500 ml. three-neck flask equipped with a mechanical stirrer, a thermometer, a reflux condenser and a gas inlet tube which extended to within about one-half inch of the bottom of the flask. The flask was charged with 17.8 grams of o-amino-N-isopropylbenzamide (M.W. 178.2), 20.4 grams of triethylamine (M.W. 102.2) and 350 ml. of p-dioxane. The mechanical stirrer was then started and the introduction of phosgene into the flask through the gas inlet tube was commenced at a rate of approximately one-half gram per minute. Phosgene (M.W. 98.9) introduction was continued until a total of 9.9 grams thereof had been introduced; this required about twenty minutes. The temperature of the reaction mixture was noted immediately prior to the introduction of phosgene, and periodically thereafter; such temperatures are presented in Table V, below, wherein the instant before the commencement of phosgene addition is treated as zero time:

TABLE V

| Time (hours:minutes:) | Temperature, degrees |
|---|---|
| 0:00 | 12 |
| 0:20 | 13 |
| 0:38 [1] | 14 |
| 0.57 | 30 |
| 1:30 | 91 |
| 2:06 | 96 |
| 2:21 | 97.5 |
| 2:53 | 100.0 |
| 3:53 [2] | 101.0 |

[1] At this point in the preparation the flask was fitted with a heating mantle and heat was transferred to the flask and contents from the mantle at a rate sufficient to cause heating as indicated.
[2] At this point heating of the flask was discontinued.

Almost immediately after phosgene introduction was commenced yellow solids appeared in the reaction mixture. After heating was begun the solids turned yellow green and at the end of the heating step a brown slurry had formed.

After the heat was turned off the reaction mixture was filtered and the filter cake was washed with 100 ml. of p-dioxane. The filtered material was triethylamine hydrochloride (M.P. 249–256° C.).

The filtrate was then quenched into 1500 ml. of water. Solids precipitated and the water-filtrate mixture was filtered, and the filter cake was washed slowly with water. 7.6 grams of product was recovered. The resulting filtrate was allowed to stand to promote additional precipitation of product and was then filtered again.

The total product obtained from the two filtrations after quenching, dried to constant weight under infrared lights, amounted to 10.3 grams (50 percent of theory) of 3-isopropyl - 2,4(1H,3H) - quinazolinedione (a light tan crystalline solid, melting point 179–184° C.).

When the above results (50 percent yield) are compared with the results obtained in Procedure No. 2, page 13 (84.6 percent yield), where the reaction was conducted in the absence of an HCl absorber, it can be seen that significantly greater yields are obtained when the reaction is conducted in the absence of an HCl absorber.

It has also been found that increased yields can be obtained by conducting the reaction in an excess of p-dioxane solvent, and then separating solvent from the reaction mixture, e.g., by vacuum distillation, until the remaining solvent is at least substantially saturated with the reaction product, and then quenching of the reaction mixture in water. This is demonstrated in Example 31, below, where the amount of p-dioxane present was in excess of the amount required to dissolve the product, and was reduced by about ½ prior to water quenching of the reaction mixture, to an amount insufficient to dissolve all of the reaction product.

EXAMPLE 31

3-isopropyl-2,4(1H,3H)-quinazolinedione was prepared in a 500 ml. three-neck flask equipped with a mechanical stirrer, a thermometer, a reflux condenser and a gas inlet tube which extended to within about one-half inch of the bottom of the flask. The flask was charged with 12.5 grams o-amino - N - isopropylbenzamide (M.W. 178.2) and 250 ml. p-dioxane. The mechanical stirrer was then started and the introduction of phosgene into the flask through the gas inlet tube was commenced at a rate of approximately one-half gram per minute. Phosgene (M.W. 98.9) introduction was continued until a total of 6.8 grams thereof had been introduced; this required about fourteen minutes. The temperature of the reaction mixture was noted immediately prior to commencement of introduction of phosgene, and periodically thereafter; such temperatures are presented in Table VI, below, wherein the instant before the commencement of phosgene addition is treated as zero time.

TABLE VI

| Time | Temperature, degrees |
|---|---|
| 0:00 | 26 |
| 0:01 | 26 |
| 0:02 | 29 |
| 0:05 | 38 |
| 0:08 | 42 |
| 0:10 | 42 |
| 0:14 [1] | 39 |
| 0:17 | 51 |
| 0:30 | 86 |
| 0:41 | 97 |
| 0:60 | 100 |
| 1:50 | 101 |
| 3:05 [2] | 101 |
| 4:20 | 24 |

[1] At this point in the preparation the flask was fitted with a heating mantle and heat was transferred to the flask and contents from the mantle at a rate sufficient to cause heating as indicated.
[2] At this point heating of the flask was discontinued.

Immediately after the phosgene introduction, the reaction mixture was a bright yellow slurry. After heating was begun the reaction mixture eventually turned to a clear, canary yellow solution.

At one hour and fifty minutes after commencement of the phosgene addition, a side arm was installed on the flask and p-dioxane was distilled until the volume of the reaction mixture was reduced by approximately one-half.

The reaction mixture (120 ml.) was then quenched into 2 volumes of water (240 ml.), and stirred for 15 minutes. The resulting slurry of water, product, and p-dioxane was filtered. The product was water washed and dried to constant weight. The filtrate was then saturated with NaCl and the solution was again filtered. The filter cake was then washed with cold water and dried to constant weight. The two filter crops were then combined. The total recovery amounted to 13.4 grams (94 percent of theory) of 3-isopropyl - 2,4(1H,3H)-quinazolinedione (a tan crystalline solid, melting point 187–188° C.). The infrared absorption pattern confirmed purity and identity of the product.

The advantage of the "working-up" procedure of Example 31 was demonstrated by repeating the procedure, but without distilling any of the p-dioxane originally charged. Temperatures noted during the reaction are presented in Table VII, below.

TABLE VII

| Time | Temperature, degrees |
|---|---|
| 0:00 | 23 |
| 0:01 | 26 |
| 0:03 | 32 |
| 0:06 | 38 |
| 0:14 [1] | 40 |
| 0:55 | 95 |
| 1:42 | 101 |
| 2:02 | 102 |
| 2:22 [2] | 102 |
| 3:12 | 47 |
| 4:02 | 26 |

[1] At this point in the preparation the flask was fitted with a heating mantle and heat was transferred to the flask and contents from the mantle at a rate sufficient to cause heating as indicated.
[2] At this point heating of the flask was discontinued.

Immediately after the phosgene introduction, the color of the reaction mixture changed from a clear yellow to a bright yellow, and a precipitate was formed. After heating was begun the precipitate dissolved resulting in the formation of a clear amber colored solution. The reaction mixture (240 ml.) was quenched in 2 volumes (480 ml.) of water. The resulting slurry of product, p-dioxane and water was cooled on an ice bath to a temperature of approximately 5°–8°, and the product was separated from the cooled slurry by filtration. The product was then dried to constant weight under infrared lights. The total recovery amounted to 12.1 grams (84.7 percent of theory) of 3-isopropyl-2,4(1H,3H)-quinazolinedione (a light tan crystalline solid, melting point 189.0–190.3° C.). Purity and identity of the product were confirmed by infrared spectroscopy.

It will be noted that, in Example 31, the filtrate was salted to force precipitation of the second crop of precipitate, whereas, when the procedure was repeated, the filtrate was merely allowed to stand. It has been found that there is no appreciable difference in the results obtained because of the varying techniques.

By comparing the results obtained in Example 31 with those obtained by the modified procedure, it can be seen that significantly improved yields are achieved when the amount of p-dioxane present is reduced to about the extent of the solubility of the product in the solvent or slightly less prior to quenching in water.

Substantially the same results can be achieved by initially utilizing only that amount of p-dioxane solvent which is required to dissolve the product prior to quenching, or slightly less, rather than the excess which was used in Example 2.

It will be apparent that various changes and modifications can be made from the specific details set forth herein without departing from the spirit and scope of the invention.

What we claim is:
1. A method for producing 3-substituted-2,4(1H,3H)-quinazolinediones, 1,3-disubstituted-2,4,(1H,3H) - quinazolinediones, and the 2,4 thio and dithio analogues thereof which consisting essentially of mixing a compound having the formula

and a compound selected from the group consisting of o-amino-N - substituted benzamides and o - amino - N-substituted thiobenzamides having the formula

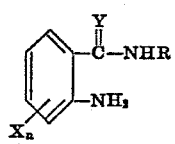

and o-substituted amino - N - substituted benzamides and o-substituted amino - N - substituted thiobenzamides having the formula

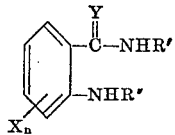

wherein n is an integer from 0 to 4; wherein R is alkyl having from 1 to 22 carbon atoms, cycloalkyl having from 3 to 6 carbon atoms, alkaryl having from 7 to 8 carbon atoms, alkenyl having 3 carbon atoms, alkynyl having 3 carbon atoms, phenyl, halo-, or nitro-substituted phenyl, or lower alkyl phenyl, or tetrahydrofurfuryl; R' is lower n-alkyl having from 1 to 6 carbon atoms, isopropyl, sec-butyl, cycloalkyl having from 3 to 6 carbon atoms, or phenyl; R" is lower n-alkyl having from 1 to 6 carbon atoms; X is halo, nitro, $CF_3$ or alkyl having from 1 to 22 carbon atoms; and Y is a member of the group consisting of oxygen and sulfur; and heating the resulting reaction mixture to a temperature sufficiently high to cause evolution of HCl, but sufficiently low that decomposition does not occur, and wherein the reaction is conducted in the absence of an HCl absorber.

2. A method as claimed in claim 1 wherein the second named reactant has the formula

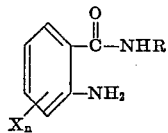

3. A method as claimed in claim 2 wherein the o-amino - N - substituted benzamide is o-amino - N-sec-butylbenzamide.

4. A method as claimed in claim 2 wherein the o-amino-N-substituted benzamide is o-amino-N-isopropylbenzamide.

5. A method as claimed in claim 2 wherein the o-amino-N-substituted benzamide is o-aminobenzanilide.

6. A method as claimed in claim 2 wherein the o-amino-N-substituted benzamide is o-amino-N-*tert*-butylbenzamide.

7. A method as claimed in claim 2 wherein the R substituent of the o-amino-N-substituted benzamide is alkyl having from 3 to 5 carbon atoms and wherein the carbon which is attached to nitrogen is also attached to at least two other carbons.

8. A method as claimed in claim 1 wherein the second-named reactant is selected from the group consisting of o-amino-N-substituted thiobenzamides and o-substituted amino-N-substituted thiobenzamides.

9. A method as claimed in claim 8 wherein the substituted thiobenzamide is o-amino-N-isopropylthiobenzamide.

10. The method of claim 1 wherein the reaction is conducted in the presence of an amount of p-dioxane in excess of that necessary to dissolve the product, and wherein after the heating step p-dioxane is separated from the reaction mixture until the remaining p-dioxane is at least substantially saturated with the reaction product, and thereafter the reaction mixture is quenched into sufficient water to cause precipitation of the product.

11. The method of claim 10 wherein p-dioxane is separated from the reaction mixture by distillation.

12. The method of claim 11 wherein the reaction product is quenched into about 2 volumes of water.

13. The method of claim 1 wherein the reaction is conducted in the presence of not more than about the quantity of p-dioxane necessary to dissolve the product, and wherein after the heating step the reaction mixture is quenched into sufficient water to cause precipitation of the product.

14. The method of claim 13 wherein the reaction mixture is quenched into about 2 volumes of water.

References Cited
UNITED STATES PATENTS
3,274,194   9/1966   Hayao _____ 260—260

DONALD G. DAUS, Primary Examiner
A. M. T. TIGHE, Assistant Examiner

U.S. Cl. X.R.
260—260, 347.2, 347.3; 551 S, 558 A